United States Patent Office

3,524,890
Patented Aug. 18, 1970

3,524,890
CYCLOPENTADIENE ADDUCTS
Eugene F. Cox, Charleston, W. Va., assignor to Union
Carbide Corporation, a corporation of New York
No Drawing. Continuation of application Ser. No.
458,431, May 24, 1965. This application Oct. 17, 1968,
Ser. No. 769,479
Int. Cl. C07c 41/02, 27/00, 29/00
U.S. Cl. 260—611
5 Claims

ABSTRACT OF THE DISCLOSURE

A vicinal epoxide is reacted with a cyclopentadiene in the presence of only a catalytic amount (not over 5%) of a base to produce adducts useful as polyols for making urethane polymers. The epoxide may be a monoepoxide, such as propylene oxide, a polyepoxide such as the dipoxides 3,4-epoxycyclohexymethyl 3,4-epoxycyclohexanecarboxylate or (1-bromo-3,4-epoxycyclohexane-1-yl)methyl 1-bromo-3,4-epoxycyclohexanecarboxylate, or a mixture of monoepoxide and diepoxide.

---

The invention relates to the production of cyclopentadiene adducts and to various derivatives thereof. In one aspect, the inveniton relates to the base catalyzed reaction of cyclopentadiene with vicinal epoxides. In another aspect, the invention relates to certain hydroxyl-containing substituted cyclopentadienes and derivatives thereof. In a still further aspect, the invention relates to various polymeric compositions that can be produced from the hydroxyl-containing substituted cyclopentadienes and derivatives thereof.

It is known that alkylene oxides add to alcohols, amines, carboxylic acids, mercaptans, and to compounds containing other reactive groups to produce hydroxyalkyl-substituted compounds. It has been reported[1] that the olefinic group contained in acrylonitrile will add to cyclopentadiene in the presence of a base catalyst to produce hexakis(2-cyanoethyl)cyclopentadiene. The addition of ethylene oxide to the organometallic compound cyclopentadienyl sodium has also been reported.[2] The product of this reaction was reported to be the dimer of (2-hydroxyethyl)cyclopentadiene, i.e., a bis(2-hydroxymethyl)-dicyclopentadiene, in 13 percent yield with (2-hydroxyethyl)cyclopentadiene being reported as the probable intermediate. It has not, however, heretofore been known that epoxides can react with compounds that are composed solely of carbon and hydrogen, such as cyclopentadiene, in the presence of catalytic quantities of base to form polyfunctional derivatives of cyclopentadiene.

In one major aspect, the present invention provides a process which comprises reacting a vicinal epoxide with cyclopentadiene in the presence of a base catalyst. This process produces hydroxy-containing substituted cyclopentadienes. The following reactions between propylene oxide and cyclopentadiene are illustrative of the process of the invention:

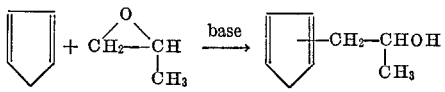

When the product of the foregoing reaction is reacted with additional propylene oxide, additional substitution can occur on the cyclopentadiene nucleus to form compounds such as bis(2-hydroxypropyl)cyclopentadiene,

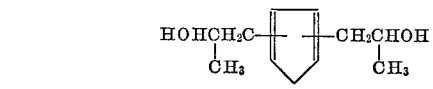

tris(2-hydroxypropyl)cyclopentadiene,

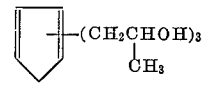

and the like. In addition to the substitution on the cyclopentadiene nucleus, propylene oxide can also react with the hydroxypropyl substituents to form ether or polyether chains, for example:

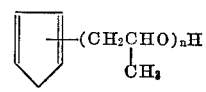

wherein $n$ is 2 or more. However, the ring substitution reaction is favored until at least two or three hydroxypropyl substituents are formed on the cyclopentadiene nucleus. Whether ring substitution or polyether formation is favored is dependent, in part, upon factors such as degree of ring substitution, nature and proportion of reactants and catalyst, reaction temperature, and the like.

An additional reaction that can take place is dimerization of the cyclopentadiene rings, for example:

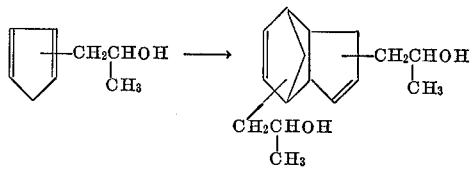

The extent to which dimerization and further polymerization of cyclopentadiene occurs is dependent, in part, upon factors such as nature and proportion of reactants and catalyst, reaction temperature, degree of substitution (for example, di-substituted cyclopentadiene is unlikely to dimerize), and the like.

Cyclopentadiene and substituted-cyclopentadienes can be employed in the process of the invention. A cyclopentadiene that is represented by Formula I can be employed in the invention:

I

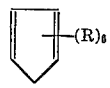

[1] H. A. Bruson, J. Am. Chem. Soc. 64, 2457 (1942).
[2] Boberg and Schultze, Z. Naturforsch, 10b, 721 (1955).

wherein each R individually can be hydrogen, alkyl, cycloalkyl, alkaryl, aralkyl, aryl, cyclopentadienyl, cyclopentadienylalkyl, and the like, provided that at least one R and preferably at least three R variables are hydrogen. Specific illustrative cyclopentadienes that can be employed in the invention include cyclopentadiene, 1-(1-cyclopentadienyl)cyclopentadiene, alkylcyclopentadienes such as methylcyclopentadiene, dimethylcyclopentadiene, trimethylcyclopentadiene, ethylcyclopentadiene, isopropylcyclopentadiene, butylcyclopentadiene, phenylcyclopentadiene, cyclohexylcyclopentadiene, benzylcyclopentadiene, tolylcyclopentadiene, indene, fluorene, 2,3-di(1-cyclopentadienyl)-butane, 2,3-dimethyl-2,3-di(1 - cyclopentadienyl)-butane, and the like. Unsubstituted cyclopentadiene is the preferred reactant for use in the invention.

The process of the invention also employs a vicinal epoxide as a reactant. Many kinds of vicinal epoxides, either singly or in combination thereof, can be used in the invention. One highly useful class are the epoxyalkanes or alkylene oxides. Illustrative alkylene oxides include ethylene oxide, 1,2-epoxypropane (propylene oxide), 1,2-epoxybutane, 2,3-epoxybutane, isobutylene oxide, the epoxypentanes, the epoxyhexanes, the epoxyoctanes, the epoxydecanes, the epoxyoctadecanes, and the like. Also useful are the epoxycycloaliphatic compounds such as epoxycyclopentane, epoxycyclohexane, epoxycycloheptane, and the like. Other vicinal epoxides that can be employed include 3-chloro-1,2-epoxypropane (epichlorohydrin), chloroprene oxide, 3-bromo-1,2-epoxypropane, styrene oxide, butyl glycidyl ether, phenyl glycidyl ether, allyl glycidyl ether, 1-vinyl-3,4-epoxycyclohexane, didecyl 2,3-epoxytetrahydrophthalate, 2,3-epoxybicyclo[2.2.1]heptane, 1-hydroxy-2,3-epoxypropane (glycidol), 3,4 - epoxy - 8,(9)-hydroxytricyclo[5.2.0$^{2,6}$]-decane, and the like.

Additional polyepoxides that are useful in the invention include those that are represented by Formula II:

II 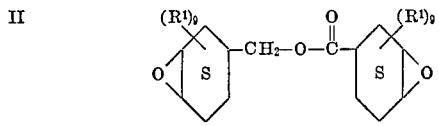

wherein each $R^1$ individually represents hydrogen or alkyl, preferably lower alkyl of from 1 to 4 carbon atoms. The preparation of these diepoxides is found in U.S. Pat. No. 2,716,123. Among the diepoxides that are represented by Formula II that deserve particular mention are the following compositions: 3,4-epoxycyclohexylmethyl 3,4-epoxycyclohexanecarboxylate; 3,4-epoxy-1-methylcyclohexylmethyl 3,4 - epoxy-1-methylcyclohexanecarboxylate; 3,4 - epoxy-6-methylcyclohexylmethyl 3,4 - epoxy-6-methylcyclohexanecarboxylate; and the like.

A second class of polyepoxides that are useful in the invention are those diepoxides that are represented by Formula III:

III 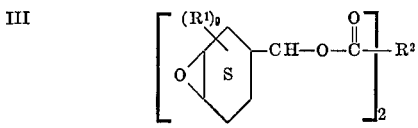

wherein each $R^1$ individually represents hydrogen or alkyl, preferably lower alkyl of from 1 to 4 carbon atoms, and wherein $R^2$ represents a divalent hydrocarbon group of from 0 to 10 carbon atoms. The preparation of the diepoxides that are represented by Formula II is found in U.S. Pat. Nos. 2,750,395 and 2,863,881. Among the diepoxides that are represented by Formula III that deserve particular mention are the following compositions: bis(3,4-epoxy-6-methylcyclohexylmethyl) adipate; bis(3,-4-epoxycyclohexylmethyl) adipate; bis(3,4 - epoxycyclohexylmethyl)oxalate; bis(3,4 - epoxycyclo - hexylmethyl) succinate; bis(3,4 - epoxy - 6 - methylcyclohexylmethyl) sebacate; bis(3,4-epoxycyclohexylmethyl) maleate; bis(3,-4-epoxycyclohexylmethyl) terephthalate; and the like.

Another useful class of polyepoxides are those that are represented by Formula IV:

IV 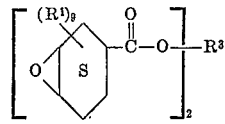

wherein $n$ is an integer having a value in the range of from 2 to 4, wherein each $R^1$ individually represents hydrogen or alkyl, preferably lower alkyl of from 1 to 4 carbon atoms, and wherein $R^3$ represents a saturated aliphatic group having a valence of $n$. The preparation of the polyepoxides that are represented by Formula IV is known, for example, see U.S. Pat. Nos. 2,745,847 and 2,884,408. Representative epoxides that are within the scope of Formula IV are the following compositions: ethylene glycol bis(3,4-epoxycyclohexanecarboxylate); diethylene glycol bis(3,4 - epoxy-6-methylcyclohexanecarboxylate); glycerol tris(3,4 - epoxycyclohexanecarboxylate); pentaerythritol tetrakis(3,4 - epoxycyclohexanecarboxylate); and the like.

A further class of polyepoxides that are useful in the invention are those that are represented by formula V:

V 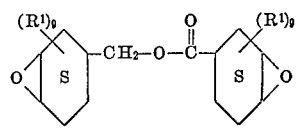

wherein each $R^1$ individually represents hydrogen, alkyl, preferably lower alkyl of from 1 to 4 carbon atoms, or halogen, preferably chloro, bromo, or iodo, provided that at least one $R^1$ is halogen. The preparation of the diepoxides that are represented by Formula V is disclosed in U.S. Pat. No. 2,874,167. Among the diepoxides that are represented by Formula V that deserve particular mention are (1-bromo-3,4-epoxycyclohexane-1-yl)methyl 1-bromo-3,4-epoxycyclohexanecarboxylate, and the like.

The selection of the particular epoxide or mixture of epoxides to be employed is dictated to a large extent by the intended use for the product. For instance, in many cases it is desired to produce a product having as many hydroxyl groups per molecule as possible. In such cases it would be desired to favor substitution on the cyclopentadiene nucleus rather than polyether formation. In order to accomplish this end, it is desirable to avoid the use of ethylene oxide as the epoxide reactant since the hydroxyethyl groups formed by reaction of ethylene oxide with cyclopentadiene contain primary hydroxyl groups. Primary hydroxyl groups, being more reactive with epoxide than are secondary or tertiary hydroxyl groups, will tend to favor polyether formation. Therefore, when it is desired to produce a product having a high degree of ring substitution, the epoxide reactant is preferably one that contains three or more carbon atoms because such epoxides will form predominantly secondary or tertiary hydroxyls in the ring substitution reaction.

The use of monoepoxides as the vicinal epoxide reactant is favored in many cases. The monoepoxides that contain up to 18 carbon atoms are generally preferred, while the alkylene oxides having up to 4 carbon atoms are more preferred for economic reasons and because of their generally greater reactivity. Propylene oxide is the most preferred monoepoxide.

In one particularly desirable embodiment of the invention, a mixture of a monoepoxide and a polyepoxide, preferably a diepoxide, is employed as the vicinal epoxide reactant. In such cases, the polyepoxide is usually employed in relatively small amounts such that the polyepoxide supplies no more than about one epoxide group equivalent per mole of cyclopentadiene in the reaction mixture. The products produced when using such a mixture of polyepoxide and monoepoxide are particularly high in functionality, that is the products have a relatively large number of hydroxyl groups per molecule. When using such a mixture, it may be desirable to first react the polyepoxide with cyclopentadiene and then react the monoepoxide with the product of this first reaction. Many other combinations are within the scope of the invention.

The vicinal epoxide reactant will normally have from 1 to 4 vicinal epoxide groups. Preferably, the vicinal epoxide is free of other groups that will react with epoxide groups in the presence of a basic catalyst. Such groups that are preferably avoided include hydroxyl, carboxylic acid, dicarboxylic anhydride, amino, amido, mercapto, and the like. Such groups are permissible but are not preferred because they can promote competing reactions.

The proportion of the reactants can vary over a wide range. For example, the cyclopentadiene:vicinal epoxide molar ratio can be within the range of from about 10:1 to about 1:25. Preferably, the cyclopentadiene:vicinal epoxide molar ratio is within the range of from about 1:1 to about 1:15, and more preferably from about 1:2 to about 1:10.

A basic catalyst is employed to promote the reaction of vicinal epoxide with cyclopentadiene. Among the catalysts that can be employed are the alkali metals such as sodium, potassium, rubidium and cesium, the alkali metal hydroxides and alkoxides such as sodium hydroxide, potassium hydroxide, rubidium hydroxide, cesium hydroxide, sodium methoxide, sodium ethoxide, potassium ethoxide, potassium isopropoxide, and the like, alkali metal hydrides such as sodium hydride, potassium hydride, and the like, tertiary amines such as trimethylamine, triethylamine, 1,4 - diazabicyclo[2.2.2]octane, bis[2 - (N,N - dimethylamino)ethyl] ether, tetramethylguanidine, and the like, quarternary ammonium hydroxides such as trimethylbenzylammonium hydroxide, trimethyl 2-hydroxyethylammonium hydroxide and the like, Grignard compounds such as ethylmagnesium chloride, propylmagnesium bromide, and the like. The catalyst is employed in a catalytic quantity sufficient to promote the reaction of vicinal epoxide with cyclopentadiene. For example, the basic catalyst is usually employed in amounts of at from about 0.05 weight percent up to about 5 weight percent, based on weight of reactants. Preferably, the catalyst is employed in amounts of from about 0.05 to about 2 weight percent, based on weight of reactants.

The process of the invention is carried out at a temperature and for a period of time sufficient to produce a hydroxyl-containing substituted cyclopentadiene. For instance, the reaction temperature can be within the range of from about 15° C. to about 260° C., and more preferably from about 50° C. to about 150° C. The reaction is exothermic, and cooling means as well as heating means will probably be required. The reaction time is dependent, in part, upon reaction temperature, nature and proportion of reactants and catalyst, nature of reaction medium, if any, and the like. Generally, the reaction will take from about 1 minute to 100 hours, or more, and preferably from about 1 hour to about 25 hours. The process of the invention can be carried out in a solvent, if desired. Among the solvents that can be used are acetonitrile, N,N-dimethylformamide, heptane, cyclohexane, tetrahydrofuran, dimethyl sulfoxide, benzene, toluene, xylene, acetone, methyl ethyl ketone, ethyl acetate, and the like. The more polar solvents such as dimethyl sulfoxide, acetonitrile, N,N-dimethylformamide, and the like are preferred. The amount of solvent employed is not narrowly critical, and the amount can vary from none to 100 weight percent, or more, based on weight of reactants.

The process of the invention can be carried out at atmospheric pressure, super-atmospheric pressure, or even at reduced pressure, if desired. However, the reaction temperature will be influenced by the boiling point of the reactants (at atmospheric pressure, cyclopentadiene boils at 41° C.), and if higher reaction temperatures are desired, super-atmospheric is preferably employed. The reaction can be conducted in an autoclave under autogenous pressure. Since the reaction is exothermic, control of the reaction when it is carried out in an autoclave will more easily be achieved if the process is started with only a small amount of reaction mixture that is heated until exotherm is observed, with the remainder of the reaction mixture being fed in increments. By so doing, the autogenous pressure can be kept within easily controllable limits, for instance below 60 p.s.i.g., and readily available reaction equipment can therefore be employed.

The products that are produced by the invention can be recovered by standard procedures. For example, the solvents and unreacted starting material can be removed by distillation. The catalyst can then be removed by passing a solution of the product in aqueous isopropyl alcohol through a cation exchange resin and then optionally through an anion exchange resin. The aqueous isopropyl alcohol can then be removed by distillation, which leaves the hydroxyl-containing substituted cyclopentadiene as a residue product.

In a second major aspect, the invention contemplates many novel compositions that can be produced by the process of the invention. Among the novel compositions are the propylene oxide adducts of cyclopentadiene that can be represented by Formula VI:

VI 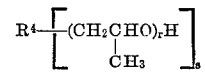

wherein $R^4$ represents a cyclopentadiene or a dicyclopentadiene group that has a valence of $s$, wherein $r$ represents a number that has a value of at least 1 and can be as high as 30 or more, and wherein $s$ represents a number having a value of at least 1, preferably has an average value of at least about 2.5, and can be as high as, for example, 6. The compositions that are represented by Formula VI can be produced by reacting propylene oxide with cyclopentadiene in accordance with the process of the invention.

A second useful class of compositions are those that can be produced by reacting a polyepoxide with cyclopentadiene in proportions such that the polyepoxide provides one vicinal epoxide equivalent per mole of cyclopentadiene. Such compositions can be represented by Formula VII:

VII 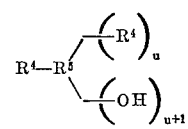

wherein $R^4$ represents a cyclopentadienyl or dicyclopentadienyl, wherein $R^5$ is the residue after removal of the vicinal epoxide groups of a polyepoxide having $u+1$ epoxide groups, and wherein $u$ represents a number having a value in the range of from 1 to 3. The compositions represented by Formula VII are illustrated by the reaction product of diglycidyl ether and cyclopentadiene,

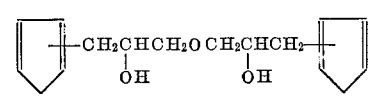

by the reaction product of cyclopentadiene and vinylcyclohexene dioxide,

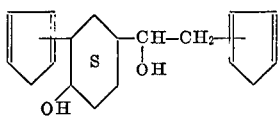

by the reaction product of cyclopentadiene and 3,4-epoxycyclohexylmethyl 3,4-epoxycyclohexanecarboxylate,

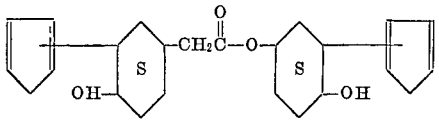

by the reaction product of bis(2,3-epoxycyclopentyl) ether and cyclopentadiene,

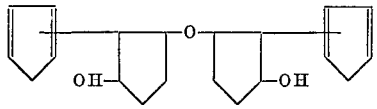

and the like.

Another class of novel compositions that can be produced by the process of the invention are those that are produced by reacting a mixture of polyepoxide and monoepoxide with cyclopentadiene wherein the polyepoxide is present in an amount no greater than that amount sufficient to provide one equivalent of vicinal epoxide per mole of cyclopentadiene. When such compositions are produced by first reacting the polyepoxide with cyclopentadiene until all of the polyepoxide has reacted, and then reacting the monoepoxide with the polyepoxide-cyclopentadiene reaction products, the thus formed compositions will contain those that are represented by Formula VIII:

VIII

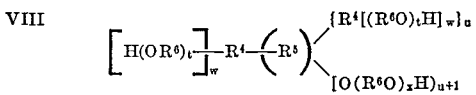

wherein $R^5$ represents the residue after removal of the vicinal epoxied groups of a polyepoxide that contains $u+1$ vicinal epoxide groups, wherein $R^4$ represents a cyclopentadiene or a dicyclopentadiene group that has a valance of $w+1$, wherein $R^6$ represents the residue after removal of the vicinal epoxide groups of a monoepoxide, wherein each $t$ individually represents a number having an average value of at least 1 and up to 30 or more, wherein $w$ represents a number having a value of from 0 to 5, wherein $x$ represents a number having a value of from 0 to 30 or more, and wherein $u$ represents a number having a value of from 1 to 3.

Specific illustrative examples of compositions that are within the scope of Formula VIII are those that are produced by reacting two moles of cyclopentadiene with one mole of the diglycidyl ether of 2,2-bis(4-hydroxyphenyl) propane to form a product which is then reacted with propylene oxide.

Compositions that are produced by reacting polyepoxide with cyclopentadiene in proportions such that there are more than one equivalent of vicinal epoxide per mole of cyclopentadiene are within the scope of the invention. Such products are useful per se and they can also be further reacted with a mono-epoxide such as propylene oxide to produce useful products.

In a third major aspect, the invention provides polymeric compositions that are derived from the hydroxyl-containing substituted cyclopentadiene that can be produced by the process of the invention. One particularly useful class of polymeric compositions are the urethane polymers that can be produced by reacting an organic polyisocyanate with one or more polyols that are represented by Formula IX:

IX

wherein $R^4$ represents a cyclopentadiene or a dicyclopentadiene group that has a valence of $y$, wherein $R^7$ represents an alkylene group of from 2 to 4 carbon atoms, wherein $r$ represents a number having a value of at least 1 and can be as high as 30 or more, and wherein $y$ is a number having a value of from 2 to 6. Those polyols that are represented by Formula IX wherein $R^7$ is a 1,2-propylene group are particularly useful in preparing urethane products.

The uethane polymers of the invention are produced by reacting an alkylene oxide adducts of cyclopentadiene with an organic polyisocyanate. Many organic polyisocyanates can be employed for this purpose, including 2,4-tolylene diisocyanate, 2,6-tolylene diisocyanate, crude tolylene diisocyanate, bis(4-isocyanatophenyl)methane, polyphenylmethylene polyisocyanates that are produced by phosgenation of aniline-formaldehyde condensation products, dianisidine diisocyanate, tolidine diisocyanate, xylylene diisocyanate, napthalene diisocyanate, hexamethylene diisocyanate, bis(2-isocyanatoethyl) fumarate, bis(2-isocyanatoethyl) carbonate, and many other organic polyisocyanates that are known in the art, such as those that are disclosed in an article by Siefken, Ann., 562, 75 (1949). In general, the aromatic polyisocyanates are preferred because of their greater reactivity.

In producing the urethane polymers of the invention one or more polyols in addition to the hydroxyl-containing substituted cyclopentadiene can be employed in the reaction with the organic polyisocyanate. Such additional polyols that can be employed are exemplified by the following classes of compositions:

(a) Polyoxyalkylene polyols including alkylene oxide adducts of, for example, water, ethylene glycol, diethylene glycol, propylene glycol, dipropylene glycol, glycerol, 1,2, 6-hexanetriol, 1,1,1 - trimethylolethane, 1,1,1-trimethylolpropane, pentaerythritol, sorbitol, sucrose, lactose, alpha-methylglucoside, alpha-hydroxyalkylglucoside, ammonia, triethanolamine, triisopropanolamine, ethylenediamine, diethylenetriamine, novolac resins, phosphoric acid, benzenephosphonic acid, polyphosphoric acids such as tripolyphosphoric acid and tetrapolyphosphoric acid, phenol-aniline-formaldehyde ternary condensation products, aniline - formaldehyde condensation products, and the like, are useful. The alkylene oxides employed in producing polyoxyalkylene polyols normally have from 2 to 4 carbon atoms. Propylene oxide and mixtures of propylene oxide with ethylene oxide are preferred.

(b) Polyesters of polyhydric alcohols and polycarboxylic acid such as those prepared from an excess of ethylene glycol, propylene glycol, 1,1,1-trimethylopropane, glycerol, or the like reacted with phthalic acid, adipic acid, and the like, are useful polyols.

(c) Lactone polyols prepared by reacting a lactone such as epsilon-caprolactone or a mixture of epsilon-caprolactone and an alkylene oxide with a polyfunctional initiator such as a polyhydric alcohol, an amine, or an aminoalcohol, are also useful.

(d) Phosphorus-containing derivatives such as tris(dipropylene) glycol phosphite and other phosphites are useful in urethane foams.

The foregoing are merely illustrative of the many polyols that can be employed in conjunction with the hydroxyl-containing substituted cyclopentadienes of the invention.

The polyols or polyol mixture employed can have hydroxyl numbers which vary over a wide range. In general, the hydroxyl numbers of the polyols employed in the invention can range from about 20, and lower, to about 1000, and higher preferably, from about 30 to about 800, and more preferably, from about 35 to about 700. The hydroxyl number is defined as the number of milligrams of potassium hydroxide required for the complete neutralization of the hydrolysis product of the fully acetylated derivative prepared from 1 gram of polyol. The hydroxyl number can also be defined by the equation:

$$OH = \frac{56.1 \times 1000 \times f}{M.W.}$$

where

OH = hydroxyl number of the polyol
f = average functionality, that is average number of hydroxyl groups per molecule of polyol
M.W. = average molecular weight of the polyol The exact polyol employed depends upon the end-use of the urethane product. For example, when used to prepare foams, the molecular weight and the hydroxyl number are selected properly to result in flexible, semi-flexible, or rigid foams. The polyol preferably possesses a hydroxyl number of from about 200 to about 1000 when employed in rigid foam formulations, from about 50 to about 250 for semi-flexible foams, and from about 20 to about 70 or more when employed in flexible foam formulations. Such limits are not intended to be restrictive, but are merely illustrative of the large number of possible combinations of the polyols that can be employed.

The urethane polymers of the invention can take the form of foamed products, elastomers, surface coatings, castings, and the like. The foamed products can be produced, for example, by the one-shot technique wherein all of the reactants are reacted simultaneously with the foaming operation. Also, the quasi-prepolymer technique can be used to produce foams. In this technique, the isocyanate is first reacted with a portion of the polyol to give a product having a high percentage of free —NCO groups (e.g., from 20 to 50 percent), and this product is subsequently foamed by reaction with polyol and foaming agent. In producing elastomers and castings, the prepolymer technique is useful. Is the prepolymer technique, the isocyanate is reacted with a slightly less than stoichiometric quantity of polyol to produce a prepolymer having a low percentage (e.g., from 1 to 10 percent) of free —NCO groups. The prepolymer is subsequently converted into an elastomer by reacting with a cross-linking agent having reactive hydrogen atoms such as a diamine, for instance, a bis(aminochlorophenyl)methane. In producing surface coatings, there are several types of known reaction techniques which can be employed. The following are representative:

(1) Use of a prepolymer having a low percentage of free —NCO that is cured by atmospheric moisture;

(2) A two-component system in which a prepolymer is mixed with a polyol just before application;

(3) A one-package system comprising two ingredients and requiring a heat cure. One of the ingredients is a polyisocyanate prepolymer in which the free —NCO groups have been blocked (e.g., with phenol) to make the isocyanate groups non-reactive until unblocked by heat. The second ingredient is a polyol.

(4) A one-component system containing no free isocyanate. Unsaturated fatty acid diglycerides are reacted with polyisocyanate to cross-link the ester chains. Cure occurs through conventional oxidative drying of the fatty acid chains.

The amount of polyisocyanate employed will vary slightly depending upon the nature of the polyurethane being prepared. In general the total —NCO equivalent to total active hydrogen equivalent (i.e., hydroxyl plus water, if water is present) should be such as to provide a ratio of 0.8 to 1.2 equivalents of —NCO per equivalent of active hydrogen, and preferably a ratio of about 1.0 to 1.1 equivalents of —NCO per reactive hydrogen.

When foams are being produced, foaming can be accomplished by employing a small amount of water in the reaction mixture (for example, from about 0.5 to 5 weight percent of water, based on total weight of the reaction mixture), or through the use of blowing agents which are vaporized by the exotherm of the isocyanate-reactive hydrogen reaction, or by a combination of the two methods. All of these methods are known in the art. The preferred blowing agents are water and certain halogen-substituted aliphatic hydrocarbon which have boiling points between about —40° C. and 70° C., and which vaporize at or below the temperature of the foaming mass. Illustrative are, for example, trichloromonofluoromethane, dichlorodifluoromethane, dichloromonofluoromethane, dichloromethane, trichloromethane, bromotrifluoromethane, chlorodifluoromethane, chloromethane, 1,1-dichloro-1-fluoroethane, 1,1-difluoro-1,2,2 - trichloroethane, chloropentafluoroethane, 1-chloro-1-fluoroethane, 1-chloro-2-fluoroethane, 1,1,2-trichloro - 1,2,2 - trifluoroethane 2-chloro-1,1,1,2,3,3,4,4,4-nonafluorobutane hexafluorocyclobutene and octafluorocyclobutane. Other useful blowing agents include low-boiling hydrocarbons such as butane pentane, hexane, cyclohexane, and the like. Many other compounds easily volatilized by the exotherm of the isocyanate-reactive hydrogen reaction also can be employed. A further class of blowing agents includes thermally-unstable compounds which liberate gases upon heating, such as N,N'-dimethyl-dinitrosoteraphthalamide.

The amount of blowing agent used will vary with the density desired in the foamed product. In general it may be stated that for 100 grams of reaction mixture containing an average isocyanate/reactive hydrogen ratio of about 1:1, about 0.005 to 0.3 mole of gas are used to provide densities ranging from 30 to 1 pound per cubic foot respectively.

Catalysts can be employed in the reaction mixture for accelerating the isocyanate-reactive hydrogen reaction. Such catalysts include a wide variety of compounds. Among the most useful catalysts are the tertiary amines and the organic tin compounds. Specific illustrative tertiary amines include N-methylmorpholine, N-ethylmorpholine, N,N,N',N',-tetramethyl-1,3-butanediamine, N,N-dimethylethanolamine, 1,4-diazabicyclo[2.2.2]octane bis-[2-(N,N-dimethylamino)ethyl] ether, and the like. Useful organic tin compounds include stannous octoate, stannous acetate, stannous oleate, dibutyltin diacetate, dibutyltin dilaurate, and the like. Many combinations of catalysts can be employed, for instance, it is useful to employ one or two tertiary amines in combination with stannous octoate (in making flexible foams) or dibutyltin dilaurate (in making rigid foams). The catalyst is employed in catalytic amounts such as from about 0.05 weight per cent to about 6 weight percent, based on weight of polyol.

When producing urethane foams, it is useful in many cases to employ a surfactant which serves as a stabilizer in making flexible foams and as a cell size regulator in making rigid foams. Polysiloxane-polyoxyalkylene block copolymers are useful surfactants for this purpose. Among the polysiloxane-polyoxyalkylene block copolymers that are useful are those that are disclosed in U.S. Pats.

2,834,748 and 2,917,480 (Bailey et al.) and 2,846,458 (Haluska). The surfactant is normally employed in amounts of from about 0.01 to about 2 weight percent, based on weight of polyol.

An excellent summary of urethane polymer chemistry and technology is found in the text by Saunders and Frisch, "Polyurethanes: Chemistry and Technology," Interscience Publishers, New York. Part I, "Chemistry," was published in 1963 and Part II, "Technology," in 1964.

The subject invention is widely useful. For instance, the hydroxyl-containing substituted cyclopentadienes that are produced by the process of the invention can be employed in producing polyester resins, they can be employed as epoxy resin hardeners, they can be esterified with drying oil acids to make surface coating compositions, they can be employed as surfactants, and they are widely useful as reaction intermediates. The urethane polymers of the invention can be employed as elastomers, rigid and flexible foams, coatings, and the like. The wide utility as gaskets, sealers, in insulation, cushions and padding, in paints and the like, of such urethane polymers is well known.

Additional utility of the hydroxyl-containing substituted cyclopentadienes of the invention is found in the Diels-Alder reaction of these compositions with dienophiles such as maleic anhydride, maleic acid and its imide and esters, maleonitrile, fumaronitrile, itaconic anhydride, acrilic acid and its esters, acrylonitrile, acrolein, alkyl and aryl vinyl ketones, acetylenedicarboxylic acid and its esters, azodicarboxylic acid esters, vinyl acetate, allylcyanide, allylamine, allyl alcohol, allyl halides, ethylene, propylene, vinyl chloride, styrene, dichlorethylenes, vinylsulfonylalkyls, vinylphosphonic acid esters, and the like. Such Diels-Alder products have wide utility as reaction intermediates in producing polyesters, polyurethanes, and the like.

The examples which follow illustrate the invention.

EXAMPLE 1

To a three-liter, four-neck glass reaction flask fitted with a stirrer, thermometer, dry ice condenser and nitrogen inlet tube and purged with nitrogen was charged 697 grams (12 moles of propylene oxide and 99 grams (1.5 moles)) of freshly distilled cyclopentadiene (stored at —80° C. until used). While the solution was stirred under a nitrogen atmosphere, 29.8 grams of 40% trimethylbenzylammonium hydroxide solution in methanol (Triton B) was added. The temperature of the reaction mixture rose from 19° C. to the reflux temperature of 34.5° C. in 30 minutes due to an exotherm. An ice bath was used to control the temperature for two hours while the reflux temperature rose to 38.5° C. The reflux temperature was 40° C. after three additional hours, and no external heating or cooling was necessary. Slight heat was applied to maintain a reflux temperature of 41° C. for an additional hour. The solution was allowed to stand for 20 hours at room temperature. The reaction mixture was stripped on a rotating evaporator up to 150° C. and 1 mm. pressure. The residue product was a dark amber, viscous liquid obtained in 92% yield. Catalyst residues were removed by treating a 50% solution of the sample in aqueous isopropyl alcohol (80%) with a cation exchange resin such as Amberlite IR 120H, followed by an anion exchange resin such as Amberlite IRA 68.

Hydroxyl number _____ 340
Equivalent weight _____ 165
Molecular weight _____ 456
Average functionality _____ 2.8
Mole ratio of oxide to cyclopentadiene:
    Charged _____ 8:1
    In product _____ 5.3:1

EXAMPLE 2

To a 2.5-gallon stirred autoclave with a heating jacket controlled with a low pressure steam-water control valve was added 143 grams (2.46 moles) of propylene oxide and 79.6 grams of trimethylamine. The autoclave was sealed and heated to 105° C. The pressure was 23 p.s.i. A mixture of 861 grams (13 moles) of cyclopentadiene and 3039 grams (52.3 moles) of propylene oxide was stored at 0° C. and was fed into the autoclave during a 2.5-hour period while a reaction temperature of 102° to 110° C. was maintained. The pressure was 59 p.s.i. when the feed was started but dropped quickly to 10 p.s.i. during the remainder of the addition. A reaction temperature of 100° C. was maintained after the addition was completed. The product was removed from the autoclave and was stripped at 150° C. at 1 mm. pressure. The residue product was a light amber, viscous liquid weighing 3846 grams (95% yield). The product was ion exchanged as described in Example 1.

Hydroxyl number _____ 510
Equivalent weight _____ 110
Molecular weight _____ 363
Average functionality _____ 3.3

Characterization of residue products

The ratio of reactants present in the residue products is obtained by elemental carbon analysis.

Equivalent weight is calculated from the hydroxyl number, determined by acetic anhydride method.

Molecular weight is determined by ebulloscopic technique.

By dividing the molecular weight by the equivalent weight the average functionality of the product is obtained.

Total unsaturation may be obtained by bromine number or by microhydrogenation.

Diene unsaturation is obtained by reaction with maleic anhydride. Cyclopentodiene reacts quantitatively with maleic anhydride to give the Diels-Alder adduct. Alder[3] reports that alkyl- and aryl-substituted cyclopentodienes, without exception, add to the same degree and with the same ease to olefin and acetylene compounds as does the simple parent substance. By using aliquots of known concentrations of polyol and anhydride in benzene and diluting to volume and following the disappearance of the infrared absorption band at 11.2 microns due to the hydrogen deformation of the maleic anhydride double bond, the amount of cyclopentadiene present possessing the diene structure may be calculated.

Since the amount of unsaturation present in diene is known and the total unsaturation is known, the difference is due to the unsaturation present in the dimer structure. Thus the distribution of cyclopentadiene between the two forms may be calculated and the total cyclopentadiene present is usually in very good agreement with the results obtained by elemental carbon analysis. From all this data the most likely structures present in the residue product can be deduced. An example would be the polyol listed under Example 2, above, with the following properties:

Hydroxyl number _____ 510
Equivalent weight _____ 110
Molecular weight _____ 363
Average functionality _____ 3.3
Mole ratio of oxide to cyclopentadiene _____ 4.0:1

---
[3] K. Alder, "Newer Methods of Preparative Organic Chemistry," p. 452, Interscience Publishers, Inc., New York, 1948.

Weight percent cyclopentadiene (by CH analysis) -- 22.1
Unsaturation as diene (as percent cyclopentadiene) (based on Diels-Alder addition to maleic anhydride ------ 12.9
Total unsaturation (as percent cyclopentadiene) (based on bromine number) ------ 19.7

$$\frac{(19.7-12.9)\% \times 2 \text{(convert to dicyclopentadiene)}}{1.38 \text{(correction factor for dimer)}^*}$$

= 9.86% cyclopentadiene as dimer
12.90% cyclopentadiene as diene
22.76% Total cyclopentadiene ---
* About 2.76 moles of bromine reacts with one mole of dicyclopentadiene.

Therefore 57% of the cyclopentadiene is present as diene structure and 43% is present as the dimer structure. The total percent cyclopentadiene (22.76%) is in good agreement with the value (22.1%) based on elemental carbon analysis.

Microhydrogenation of the polyol gave a H number (grams of sample to react with 1 mole of $H_2$) of 210.4 and allows another approach of calculating the ratio of diene to dimer. Since the polyol contains 22.1% cyclopentadiene, 210.4 grams contain 46.5 grams of cyclopentadiene. The H number for cyclopentadiene is 33.05 and for dimer 66.10.

$$(33.05)(1-x)+(66.10)(x)=46.5$$

$x=0.407$ or 40.7% as dimer
59.3% as diene

Since two cyclopentadienes are present in dimeric structure, there are 40.7/2 or 20.35 molecules possessing the dimer structure compared to 59.3 with diene structure or 25.5 and 74.5%, respectively.

The following structures are probable as the major products in the polyol of Example 2.

EXAMPLE 3

To a twelve-liter, four-neck flask equipped with a stirrer, thermometer, Dry Ice condenser, dropping funnel and nitrogen inlet tube was charged 661 grams (10 moles) of cyclopentadiene and 580 grams (10 moles) of propylene oxide. To the solution at —6° C. was added 56 grams of a 40% solution of trimethylbenzylammonium hydroxide in methanol and the solution was heated to reflux at 35° C. in 30 minutes. During a nine hour period a total of 2490 grams (43 moles) of propylene oxide was fed into the reaction flask while a reflux temperature between 36° C. and 45° C. was maintained. The reaction solution was cooled to 25° C. and allowed to stand at room temperature 13 hours. Upon being heated, the solution began refluxing at 46° C., and, without any external heating, the reflux temperature rose to 99° C. over a three hour period. The reaction mixture was heated to 150° C. and then stripped and ion exchanged as in Example 1. The yield was 96%.

Hydroxyl number—446
Equivalent weight—126
Molecular weight—389
Average functionality—3.1
Viscosity at 25° C.—29,000 centipoises
pH—6.15 (10 gram sample in 60 ml. of 10:6 isopropanol:water solution)
Mole ratio of oxide to cyclopentadiene:
  Charged—5.3:1
  In product—6.7:1

EXAMPLE 4

To a 2.5-gallon stirred autoclave jacketed for heating or cooling was charged 3,480 grams (60 moles) of propylene oxide, 990 grams (15 moles) of cyclopentadiene and 137 grams of a 40% solution of trimethylbenzyl-

| Approximate percentage | Structure | Mol. Wt. | Functionality | Ratio; Oxide CPD |
|---|---|---|---|---|
| 25 | (structure with CH₂CHOCH₂CHOH, CH₃, CH₃, HOCHCH₂, CH₃) | 306 | 2 | 1.5 |
| 25 | (structure with CH₂CHOCH₂CHOH, CH₃, CH₃, (CH₂CHOH, CH₃)₂) | 298 | 3 | 4 |
| 25 | (structure with CH₂CHOCH₂CHOH, CH₃, CH₃, (CH₂CHOH, CH₃)₃) | 356 | 4 | 5 |
| 25 | (structure with CH₂CHOHCH₂CHOH, CH₃, CH₃, (CH₂CHOH, CH₃)₄) | 414 | 5 | 6 |
| Average | | 344 | 3.5 | 4.1 | ammonium hydroxide in methanol. The autoclave was sealed and heated to 80° C. in 40 minutes. The reaction was exothermic and required cooling to maintain the reaction temperature between 70° and 90° C. for the next 20 minutes. Heat was applied to keep the temperature at 90° C. for an additional hour. The residue product was stripped and ion exchanged as described in Example 1. The yield was 99%.

Hydroxyl number—517
Equivalent weight—108
Molecular weight—353
Average functionality—3.3
Viscosity at 25° C.—341,000 centipoises
pH—6.42 (10-gram sample in 60 ml. of 10:6 isopropanol:water solution)
Mole ratio of oxide to cyclopentadiene:
  Charged—4:1
  In product—4.2:1

EXAMPLES 5 AND 6

*Example 5.*—To a one-liter stirred autoclave equipped with a coil and cooled to 0° C., was charged 33 grams (0.5 mole) of cyclopentadiene, 26 grams of butane as diluent, 132 grams (3 moles) of ethylene oxide and nine grams of a 40% solution of trimethylbenzylammonium hydroxide in methanol. The autoclave was sealed, the stirrer was turned on and the reaction mixture was slowly heated. After 1.5 hours the temperature was 90° C., the pressure was 145 p.s.i., and the reaction became exothermic. Water was passed through the cooling coil to control the exotherm for the next ten minutes during which time the maximum temperature was 120° C. and pressure was 190 p.s.i. A temperature of 110° C. was maintained for an additional 1.5 hours to complete the reaction. The residue product was stripped and was a very dark amber, viscous liquid that weighed 151 grams (91% yield).

Hydroxyl number _____ 376
Equivalent weight _____ 149
Molecular weight _____ 390
Average functionality _____ 2.6
Mole rate of oxide to cyclopentadiene:
  Charged _____ 6:1
  In product _____ 8.8:1

*Example 6.*—To a one-liter stirred autoclave fitted with a cooling coil and cooled to 0° C. was charged a solution of 6.2 grams of trimethylamine and 22 grams (0.38 mole) of propylene oxide. The mixture was heated to 130° C. at pressure of 140 p.s.i. in one hour. A solution containing 49.5 grams (0.75 mole) of cyclopentadiene and 239 grams (4.12 moles) of propylene oxide and maintained at 0° C. was fed into the autoclave during a one hour period. Water was passed through the cooling coil as needed to maintain a reaction temperature of 130° C. After addition was completed, the mixture was heated for an additional hour at 110° C. After being stripped and ion exchanged as described in Example 1, the residue product weighed 223 grams (92% yield).

Hydroxyl number _____ 464
Equivalent weight _____ 121
Molecular weight _____ 417
Average functionality _____ 3.45
Mole ratio of oxide to cyclopentadiene:
  Charged _____ 6:1
  In product _____ 7.8:1

The reaction conditions employed in Examples 5 and 6 were substantially identical in all material respects except that ethylene oxide was employed in Example 5 and propylene oxide was employed in Example 6. The functionality of the product obtained when using propylene oxide was significantly higher than the functionality of the ethylene oxide product. Higher functionality is a distinct advantage in many applications, for example, in producing rigid urethane foams.

EXAMPLES 7–22

A series of reactions were conducted between cyclopentadiene and propylene oxide in a manner analogous to the procedure described in Example 1. The reactions were conducted at atmospheric pressure at the temperatures and for the times indicated in Table I, below. Where two temperatures are indicated, the lower was the reaction temperature during most of the reaction and the higher is the temperature reached during the brief initial exotherm. The catalyst was either 40 percent trimethylbenzylammonium hydroxide in methanol ("TMBA") or trimethylamine ("TMA"). In some cases, only a portion of the propylene oxide was charged initially, with the remainder being fed gradually. Catalyst concentration shown is based on total weight of reactants, with the figure in parentheses being based on weight of initial charge. Table I displays the reaction conditions and the analysis of the product for each reaction. In Example 16, only 33 grams of cyclopentadiene were in the initial charge. The remainder was charged after 2 hours. In Example 21, only 75 grams of cyclopentadiene was in the initial charge, the remainder was fed with propylene oxide over a period of 5 hours.

TABLE I.—REACTION OF CYCLOPENTADIENE (CPD) WITH PROPYLENE OXIDE (PrO) AT ATMOSPHERIC PRESSURE

| Example Number | CPD, grams | PrO, grams | | Catalyst | Catalyst conc., percent | Reaction time, hrs. | Reaction temp., °C. | Mole Ratio of PrO:CPD | | Analysis of Product | | | |
|---|---|---|---|---|---|---|---|---|---|---|---|---|---|
| | | Charge | Feed | | | | | Charge | Product | Hydroxyl No. | Mole Wt. | Equiv. Wt. | Functionality |
| 7 | 44 | 219 | | TMBA | 1.0 | 24 | 40 | 6:1 | 4.1:1 | 544 | 290 | 103 | 2.76 |
| 8 | 99 | 697 | | TMBA | 1.4 | 24 | 42 | 6:1 | 5.3:1 | 339 | 456 | 165 | 2.78 |
| 9 | 99 | 697 | | TMBA | 2.7 | 24 | 51 | 6:1 | 4.5:1 | 353 | 416 | 159 | 2.62 |
| 10 | 99 | 697 | | TMBA | 4.9 | 6 | 50 | 6:1 | 6:1 | 400 | 380 | 140 | 2.72 |
| 11 | 33 | 174 | | TMA | 7.3 | 24 | 33 | 6:1 | 7.3:1 | 418 | 439 | 131 | 3.35 |
| 12 | 661 | 580 | 2,490 | TMBA | 0.6(1.7) | 26 | 36–45 | 6:1 | 6.7:1 | 446 | 389 | 126 | 3.09 |
| 13 | 99 | 106 | 416 | TMBA | 0.6(1.8) | 6 | 81–128 | 6:1 | | 446 | 420 | 126 | 3.33 |
| 14 | 78 | 50 | 365 | TMBA | 0.8(2.7) | 2 | 83–120 | 6:1 | | 583 | 262 | 96 | 2.73 |
| 15 | 330 | 290 | 1,450 | TMBA | 1.2(3.5) | 24 | | 6:1 | 6:1 | 448 | 380 | 125 | 3.04 |
| 16 | 665 | 348 | 104 | TMBA | 3.4 | 6 | 83–120 | 7.8:1 | 6.9:1 | 448 | 400 | 125 | 3.20 |
| 17 | 44 | 395 | | TMBA | 0.7 | 24 | 39 | 10:1 | 4.8:1 | 568 | 317 | 99 | 3.20 |
| 18 | 447 | 392 | 1,163 | TMBA | 1.0(2.2) | 12 | 92–107 | 4:1 | 4.3:1 | 493 | 338 | 114 | 2.96 |
| 19 | 660 | 1,160 | | TMBA | 1.0 | 6 | 95–116 | 2:1 | 1.9:1 | 496 | 292 | 113 | 2.58 |
| 20 | 462 | 814 | | TMBA | 1.4 | 4 | 80–96 | 2:1 | | 467 | 361 | 120 | 1.30 |
| 21 | 698 | 85 | 534 | TMBA | 0.8(5.8) | 7 | 77–104 | 1:1 | 1.2:1 | 468 | 233 | 120 | 1.94 |
| 22 | 990 | 870 | | TMBA | 1.4 | 17 | 98–109 | 1:1 | 2.5:1 | 474 | 291 | 118 | 2.46 |

EXAMPLES 23–47

By procedures analogous to that described in Example 2, a series of reactions between cyclopentadiene and propylene oxide were conducted in a stirred autoclave using various base catalysts. Table II below, displays the reaction conditions and the analyses of the products.

Example 2 (for those in stirred autoclave), a series of reactions were carried out between propylene oxide and

TABLE II.—CYCLOPENTADIENE-PROPYLENE OXIDE REACTION IN STIRRED AUTOCLAVE

| Example No. | Cyclopentadiene, g. | Propylene oxide, g. | | Catalyts | Catalyst conc., percent by weight [1] | Reaction time, hrs. | Yield percent | Hydroxyl Number | Equiv. wt. | Mole wt. | Mole ratio of oxide to cyclopentadiene | | Functionality [3] |
| | | In charge | In feed | | | | | | | | In charge | In product [2] | |
| --- | --- | --- | --- | --- | --- | --- | --- | --- | --- | --- | --- | --- | --- |
| 23 | 22 | 116 | | Sodium [4] | 1.1 | [5] 2 | 95 | 455 | 123 | 447 | 6:1 | 6.7:1 | 3.60 |
| 24 | 66 | 348 | | "Triton B" | 1.7 | [6] 4 | 89 | 496 | 113 | 338 | 6:1 | 6.4:1 | 3.44 |
| 25 | 33 | 174 | | NaOMe [7] | 1.0 | [8] 3.5 | 97 | 431 | 130 | 411 | 6:1 | 7.5:1 | 3.16 |
| 26 | 660 | 3,480 | | NaCPD [9] | 0.8 | [10] 6 | [11] 72 | 420 | 134 | 424 | 6:1 | 7.0:1 | 3.16 |
| 27 | 660 | 3,480 | | NaCPD [9] | 1.3 | [12] 4.5 | 99 | 449 | 125 | 428 | 6:1 | 6.9:1 | 3.43 |
| 28 | 33 | 174 | | TMA [13] | 2.0 | [14] 2 | 99.8 | 494 | 114 | 451 | 6:1 | 6.4:1 | 3.96 |
| 29 | 66 | 348 | | TMA [13] | 2.0 | [15] 1 | 99 | 471 | 119 | 410 | 6:1 | 7.8:1 | 3.45 |
| 30 | 66 | 348 | | TMA [13] | 1.0 | [16] 4 | 55 | 468 | 120 | 447 | 6:1 | 5.7:1 | 3.72 |
| 31 | 66 | 348 | | TMA [13] | 1.0 | [17] 2.5 | 60 | 475 | 118 | 434 | 6:1 | 6.2:1 | 3.68 |
| 32 | 99 | 87 | 435 | Sodium [4] | 0.4(1.4) | [18] 4.5 | 87 | 394 | 142 | 475 | 6:1 | 10:1 | 3.35 |
| 33 | 582 | 708 | 2,352 | do [4] | 0.27(0.8) | [19] 6 | 96 | 326 | 172 | 571 | 6:1 | 10:1 | 3.34 |
| 34 | 66 | 58 | 290 | KOH [20] | 0.29(1.0) | [21] 6.5 | 93 | 228 | 246 | 697 | 6:1 | 12:1 | 2.83 |
| 35 | [22] 49.5 | 22 | 239 | TMA [13] | [23] 2.0 | [24] 2.5 | 92 | 464 | 121 | 417 | 6:1 | 7.8:1 | 3.45 |
| 36 | 132 | 116 | | Sodium [4] | 1.0 | [25] 2 | 73 | 492 | 114 | 260 | 1:1 | 1.8:1 | 2.28 |
| 37 | [26] 330 | 58 | 242 | do | 1.1 | [27] 2 | 35 | 435 | 129 | 287 | 1:1 | 1.9:1 | 2.22 |
| 38 | [22] 132.5 | | 233 | TMA [13] | [28] 2.0 | [29] 1 | 68 | 497 | 113 | 317 | 2:1 | 2.7:1 | 2.80 |
| 39 | [22] 132 | | 348 | TMA [13] | [28] 2.0 | [30] 2 | 76 | 488 | 115 | 354 | 3:1 | 4.0:1 | 3.08 |
| 40 | [22] 99 | 38 | 300 | TMA [13] | [23] 2.0 | [31] 1 | 95 | 473 | 118 | 350 | 4:1 | 4.6:1 | 2.86 |
| 41 | 99 | | 348 | TMA [13] | [28] 2.0 | [32] 2 | 90 | 482 | 116 | 369 | 4:1 | 4.0:1 | 3.20 |
| 42 | 99 | 31 | 317 | TMA [13] | [28] 2.0 | [33] 1 | 83 | 486 | 115 | 369 | 4:1 | 4.2:1 | 3.20 |
| 43 | [24] 132 | 232 | 232 | NaOMe [7] | 0.33(0.66) | [25] 5 | 95 | 439 | 128 | 373 | 4:1 | 5.4:1 | 2.92 |
| 44 | 990 | 3,480 | | "Triton B" [36] | 1.2 | [37] 3.5 | 99 | 539 | 104 | 332 | 4:1 | 4.2:1 | 3.19 |
| 45 | [38] 165 | 116 | 464 | NaCPD [9] | 5.2(15.0) | [39] 4.5 | 84 | 300 | 187 | 347 | 4:1 | 2.7:1 | 185 |
| 46 | [40] 132 | | 464 | NaCPD [9] | 3.1(27.4) | [41] 6 | 96 | 326 | 172 | 415 | 4:1 | 3.8:1 | 2.42 |
| 47 | 33 | 348 | | "Triton B" | 1.9 | [42] 4.5 | 91 | 362 | 156 | 520 | 12:1 | | 3.32 |

[1] Percent catalyst is based on total weight of reactants; the percent in ( ) is based on the initial charge.
[2] Based on elemental carbon analysis.
[3] Functionality is the molecular weight divided by the equivalent weight.
[4] Catalyst added as a 50% dispersion in toluene.
[5] Solution slowly heated to 90° C. and 43 p.s.i. in 1 hour 15 min; temperature of 90 to 97° C. maintained for 45 min. while pressure dropped to 4 p.s.i.
[6] Charge was heated to 65° C. at 21 p.s.i. in 2.5 hours; exotherm to 88° C. and 46 p.s.i. in 5 min.; temperature maintained at 80° C. for 1 hour while pressure dropped to 0 p.s.i.
[7] Catalyst was sodium methoxide.
[8] Charge was heated to 65° C. in 30 min.; exotherm to 87° C. and 50 p.s.i. in 6 min.; temperature slowly raised to 100° C. in 2 hours while pressure dropped to 21 p.s.i.; temperature maintained at 100° C. for an additional hour pressure dropped to 0 p.s.i.
[9] Catalyst was sodium cyclopentadiene added as a 27.5% slurry in toluene.
[10] Charge was heated to 60° C. and 24 p.s.i. in 1.5 hours; to 80° C. and 32 p.s.i. after 3.5 hours; to 105° C. and 22 p.s.i. after 5 hours; to 113° C. and 2 p.s.i. after 5.5 hours.
[11] Low yield due to leak in autoclave.
[12] Charge was heated 70° C. and 32 p.s.i. in 70 min.; exotherm to 98° C. and 49 p.s.i. in 5 minutes and temperature maintained at 77–82° C. for 45 min. After 2.5 hours the temperature was raised to 102° C. and 61 p.s.i. and temperature maintained at 106–104° C. for 2 hours while pressure dropped to 0 p.s.i.
[13] Catalyst was trimethylamine.
[14] Charge heated to 90° C. in 1 hour, exotherm to 130° cooled to 98° in 3 min. and maintained at 90° for 45 min.
[15] Charge heated to 95° C. in 45 min. exotherm to 150° in 10 min., cooled to 100° C. and maintained for 12 min.
[16] Charge heated to 120° C. in 2 hours, slight exotherm to 125° C. and maintained at 120° C. for 2 hours.
[17] Charge heated to 120° C. in 1 hour 20 min., slight exotherm to 132° C. and maintained at 130° C. for 1 hour.
[18] Charge was heated to 64° C. in 70 min.; exotherm to 108° C. and 65 p.s.i. in 8 min.; the feed was added over a 2 hour period maintaining a temperature of 90–95° C. and 30 to 36 p.s.i.; temperature was held at 90° C. for 1.5 hours while the pressure dropped from 36 to 16 p.s.i.
[19] Charge was heated to 67° C. and 22 p.s.i. in 1 hour when feed was started. Temperature of 80° C. and a pressure of 30 p.s.i. was maintained for 2.5 hours while 1400 gms. of feed was added. The temperature was then increased to 103° C. at a pressure of 50 p.s.i. for 1.5 hours while the remaining feed was added. The temperature was maintained at 103° C. for an additional hour while pressure dropped to 25 p.s.i.
[20] Catalyst was powdered potassium hydroxide.
[21] Charge heated 118° C. in 50 min., exotherm to 184° C. and 122 p.s.i feed added at 110°–120° C. over a 5.5 hour period.
[22] All the CPD was added as feed along with the PrO.
[23] All of the catalyst was charged to the bomb along with the initial amount of PrO.
[24] Charge heated to 130° C. in 1 hour, feed added in 1 hour maintaining 130° C. reaction temperature.
[25] Solution slowly heated to 70° C. and 30 p.s.i. in 40 min.; exotherm to 100° C. and 68 p.s.i. in 5 min; temperature maintained at 90° C. for 30 min. while pressure dropped to 8 p.s.i.; solution was allowed to cool for 45 min. before removing.
[26] 66 g. was charged, the remaining 264 was added along with 242 g. of propylene oxide.
[27] Charge was heated to 86° C. and 23 p.s.i. in 1 hour; feed added over a 4 hour period maintaining 85° C. reaction temperature while pressure went from 8 to 32 p.s.i. After 6 hours at 85° C. the pressure was 24 p.s.i. reaction stopped.
[28] Catalyst was mixed with the feed.
[29] Bomb heated to 120; feed started and reaction temperature maintained at 135° for 1 hour while feed was added.
[30] Bomb heated to 125; feed started and reaction temperature maintained at 96° C. for 2 hours while feed was added.
[31] Bomb heated to 116° C.; feed started and reaction temperature maintained at 125° C. for 1 hour while feed was added.
[32] Bomb heated to 125° C; feed started and reaction temperature maintained 132–136° C. for 2 hours while feed was added.
[33] Bomb heated to 112° C.; feed started and reaction temperature maintained 144–150° C. for 1 hour while feed was added.
[34] 66 g. was charged, the remaining 66 g. was added with feed.
[35] Charge was heated to 80° C. in 1 hour; temperature maintained at 85–90° and a pressure of 36 p.s.i. for 3.5 hours during addition of feed; heating at 90° C. for 1 additional hour pressure dropped from 36 to 24 p.s.i.
[36] Catalyst was "Triton B" added as 40% solution in methanol; 0.3 g. of p-isopropylcatechol also added.
[37] Charge was heated to 80° C. at 42 p.s.i. in 35 min.; exotherm to 98° C. at 112 p.s.i. in 1 min.; after cooling to 70° C. in 6 min. the reaction became very exothermic and temperature went to 150° C. at 152 p.s.i. in 3 min. Temperature maintained between 60 and 90° C. for 2.5 hours and pressure dropped to 0 p.s.i.
[38] Only 33 g. of CPD was charged to the autoclave, the remaining 132 g. was added in the feed.
[39] Charge heated to 70° C; exothermic to 130; 200 ml. of feed added over a 2.5 hour period at 150° C. reaction stopped because the addition was slow.
[40] All of the CPD was fed into the reactor as a mixture with the PrO.
[41] Charge heated to 100° C.; feed started; exotherm to 120° C.; feed added over a 2 hour period maintaining a reaction temperature of 125° C.
[42] Charge was heated to 60° C. at 20 p.s.i. in 70 min.; exotherm to 74° C. at 32 p.s.i. in 5 min.; temperature maintained at 75–80° C. for 3 hours while pressure dropped to 0 p.s.i. after 2 hours.

Examples 48–76

By procedures analogous to those described in Example 1 (for those at atmospheric pressure) and in cyclopentadiene in various solvents. Table III, below, displays the reaction conditions and the analyses of the products.

TABLE III.—CYCLOPENTADIENE-PROPYLENE OXIDE REACTION IN VARIOUS SOLVENTS

| Ex. No. | Solvent[1], grams | Cyclopenta-diene, g. | Propylene oxide, g. In charge | Propylene oxide, g. In feed | Catalyst conc., percent by weight[2] | Reaction conditions Temp., °C. | Reaction conditions Time, hrs. | Yield, percent | Hy-droxyl No. | Equiv. wt. | Mole wt. | Func-tion-ality | Ratio of Oxide to Cyclopentadiene In charge | Ratio of Oxide to Cyclopentadiene In product[3] |
|---|---|---|---|---|---|---|---|---|---|---|---|---|---|---|
| 48 | ACN, 102 | 67.3 | 120 | 288 | 1.25(1.3) | 22–79 | 26 | 95 | 447 | 126 | 420 | 3.33 | 7:1 | 7.4:1 |
| 49 | ACN, 100 | [4] 132.4 | 39 | 657 | 0.48(2.3) | 55 | 26 | 77 | 469 | 120 | 345 | 2.88 | 6:1 | 5:1 |
| 50 | ACN, 610 | 264 | 232 | 1,160 | 0.60(1.1) | 40–55 | 7 | 63 | 524 | 107 | 330 | 3.08 | 6:1 | 3:1 |
| 51 | ACN, 101 | 146 | 130 |  | 1.0 | 40–75 | 3 | 55 | 508 | 110 | 265 | 1.41 | 1:1 | 1.5:1 |
| 52 | ACN, 50 | 66.2 |  | 348 | 0.95(3.4) | 22–45 | 22 | 70 | 451 | 124 | 335 | 2.70 | 6:1 | 3.5:1 |
| 53[5] | ACN, 128 | 33 | 174 |  | 1.0 | 80 | 2.5 | 89 | 504 | 110 | 354 | 3.12 | 6:1 | 7.7:1 |
| 54[5] | ACN, 100 | 33 | 116 |  | 1.2 | 110 | 2.5 | 87 | 596 | 94 | 322 | 3.43 | 6:1 | 4.2:1 |
| 55[5] | ACN, 25 | 66 | 232 |  | 1.2 | 80 | 2.3 | 91 | 555 | 101 | 320 | 3.17 | 4:1 | 4:1 |
| 56 | ACN, 55[6] | 66 |  | 477 | [7] 0.68(2.3) | 25–57 | 25 | 69 | 431 | 130 | 414 | 3.18 | 8:1 | 4.8:1 |
| 57 | DMF, 50 | 33 |  | 116 | 2.2(4.3) | 15–72 | 3.5 | 80 | 593 | 95 | 277 | 2.92 | 4:1 |  |
| 58 | HPT, 50 | 66 |  | 270 | 1.18(3.2) | 32–51 | 6.5 | 70 | 534 | 105 | 297 | 2.83 | 4.65:1 | 4.7:1 |
| 59 | HPT, 100 | 66 | 350 | 290 | 2.7(3.6) | 25–49 | 23 | 70 | 411 | 136 | 440 | 3.23 | 12:1 | 10:1 |
| 60 | HMP, 36 | 66 | 348 |  | 0.8 | 33–48 | 94 | 59 | 459 | 122 | 330 | 2.71 | 6:1 | 12:1 |
| 61 | MeOH, 126 | 33 |  | 174 | 20(35) | 50–90 | 2 | [8] 56 | 356 | 158 | 302 | 1.91 | [9] 6:1 | 1:1 |
| 62 | MeOH, 126 | 33 |  | 174 | 20(35) | 50–60 | 20 | [8] 56 | 355 | 158 | 302 | 1.91 | [9] 6:1 | 1:1 |
| 63 | THF, 100 | [10] 56 |  | 224 | [11] 0.87(2.5) | 23–45 | 24 | 37 | 507 | 111 | 380 | 3.42 | 4:1 | 2.1:1 |
| 64[5] | THF, 60 | 66 | 232 |  | [11] 0.38 | 86–110 | 4 | 95 | 459 | 122 | 375 | 3.07 | 4:1 | 4.7:1 |
| 65 | THF, 50 | 66 |  | 348 | [11] 0.23(0.8) | 40 | 47 | 11.3 | 535 | 105 |  |  | 6:1 | 2.1:1 |
| 66 | DMSO, 100 | 66 |  | 232 | [11] 0.47(2.4) | 50 | 5 | 67 | 590 | 95 | 290 | 3.06 | 4:1 | 2.6:1 |
| 67 | DMSO, 50 | 66 |  | 348 | [11] 0.24(0.7) | 47–45 | 24 | 64 | 551 | 102 | 311 | 3.05 | 6:1 | 3.65:1 |
| 68[5] | DMSO, 100 | 33 | 174 |  | 1.2 | 88–95 | 3.5 | 97 | 494 | 114 | 380 | 3.33 | 6:1 | 5.6:1 |
| 69[5] | DMSO, 100 | 33 | 174 |  | 1.2 | 84–94 | 1.5 | 92 | 410 | 110 | 407 | 3.70 | 6:1 | 5.8:1 |
| 70[5] | DMSO, 100 | 33 | 174 |  | 1.2 | 85 | 3 | 92 | 450 | 125 | 511 | 4.05 | 6:1 | 8.0:1 |
| 71[5] | DMSO, 100 | 33 | 174 |  | [12] 1.3 | 101–150 | 1.5 | 95 | 537 | 104 | 421 | 4.05 | 6:1 | 8.0:1 |
| 72[5] | DMSO, 100 | [10] 66 |  | 348 | [12],[13] 1.93(7.4) | 125 | 1.8 | 99 | 513 | 109 | 435 | 4.00 | 6:1 | 6.9:1 |
| 73[5] | DMSO, 10 | [10] 66 |  | 348 | [12],[14] 2.0(0) | 125 | 1.8 | 95 | 478 | 117 | 396 | 3.38 | 6:1 | 5.1:1 |
| 74[5] | THF, 47 | [10] 66 |  | 348 | [12] 2.3(18.2) | 120 | 2 | 92 | 364 | 154 | 524 | 3.40 | 6:1 | 7.7:1 |
| 75[5] | Benzene, 26 | 33 | 174 |  | [15] 2.0 | 123 | 1.5 | 95 | 453 | 124 | 455 | 3.67 | 6:1 | 7.2:1 |
| 76[5] | Benzene, 13 | 33 | 174 |  | [16] 2.0 | 128 | 1.5 | 93 | 449 | 125 | 455 | 3.64 | 6:1 |  |

[1] ACN=acetonitrile; DMF=dimethylformamide; HPT=heptane; HMP=hexamethylphosphoramide; MeOH=methanol; THF=tetrahydrofuran; DMSO=dimethylsulfoxide.
[2] Catalyst unless noted otherwise is trimethylbenzyl ammonium hydroxide added as 40% solution in methanol. Percent is based on total weight of reactants, percent in (  ) is based on initial charge including solvent if present.
[3] Based on elemental carbon analysis.
[4] Only 22.2 g. of cyclopentadiene in initial charge, the remaining 110 g. was added with propylene oxide feed.
[5] Reaction performed in stirred autoclave.
[6] Also 40 gms. of toluene present.
[7] Catalyst was sodium dispersed in toluene.
[8] Yield is low because of the reaction of propylene oxide with MeOH to give 1-methoxy 2 propanol.
[9] Since about 50% of the oxide reacted with methanol, the actual ratio is 3:1.
[10] All CPD was added in the feed.
[11] Catalyst was sodium methoxide.
[12] Catalyst was trimethyl amine.
[13] All the catalyst was charged with just the solvent.
[14] All the catalyst was added with the feed.
[15] Catalyst was cyclopentadienylpotassium.
[16] Catalyst was a mixture of 1% trimethylamine and 1% cyclopentadienylpotassium.

EXAMPLE 77

Urethane foams were produced from the polyols of Examples 3 and 4. Quasi-prepolymers prepared by reacting excess tolylene diisocyanate with each of the polyols. The quasi-prepolymers thus prepared had a free NCO content of 30 percent. Foams were prepared from the quasi-prepolymers in each of the following systems (1) from straight polyol of Example 3 or 4, (2) polyol of Example 3 or 4 mixed with glycerol to a hydroxyl number of 540, and (3) 90 parts of polyol of Example 3 or 4 plus 10 parts of the propylene oxide adduct of diethylenetriamine having a hydroxyl number of 700 (called Polyol A). The formulations employed were as follows (parts are by weight):

| Component | System (1) | System (2) | System (3) |
|---|---|---|---|
| Polyol of Example 3 or 4 | 100 | 91.5–98.2 | 90 |
| Glycerol |  | 8.5–1.8 |  |
| Polyol A |  |  | 10 |
| Trichloromonofluoromethane | 39 | 38 | 38 |
| Dibutyltin dilaurate | 0.4–0.6 |  | 0.1–0.2 |
| 1,4-Diazabicyclo[2.2.2]octane |  | 2.4 |  |
| N,N,N′N′-tetramethyl-1,3-butanediamine | 0.2–0.4 |  |  |
| Silicone surfactant[1] | 1.5 | 1.5 | 1.5 |
| Quasi-prepolymer | 5% excess | | |

[1] A block copolymer of the formula:

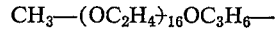

wherein R is a group of the formula $$CH_3-(OC_2H_4)_{16}OC_3H_6-$$

Table IV, below, displays representative properties of the foams made from the above formulations:

TABLE IV.—FOAM PROPERTIES

| Property | Example 3 System (1) | Example 3 System (2) | Example 3 System (3) | Example 4 System (1) | Example 4 System (2) | Example 4 System (3) |
|---|---|---|---|---|---|---|
| Cream time, seconds | 19 | 15 | 18 | 25 | 20 | 25 |
| Rise time, seconds | 94 | 140 | 130 | 95 | 125 | 150 |
| Tack-free time, seconds | 94 | 120 | 120 | 85 | 95 | 130 |
| Density, pounds/ft.³ | 1.86 | 1.92 | 1.98 | 1.93 | 1.94 | 1.93 |
| Compressive Strength, p.s.i.: | | | | | | |
| Parrallel to foam rise | 38 | 44 | 43 | 48 | 46 | 44 |
| Perpendicular to foam rise | 14 | 17 | 15 | 16 | 16 | 16 |

EXAMPLE 78

A polyol was produced from the following reactants:

Cyclopentadiene—33 grams (0.5 mole)
Propylene oxide—126 grams (2.17 moles)
Diglycidyl diether of 2,2-bis(4-hydroxypheny)propane—85 grams (0.25 mole)

The above materials were charged to a nitrogen-purged 1-liter, 4-necked reaction flask equipped with a mechanical stirrer, thermometer, Dry Ice-acetone condenser and a dropping funnel, and were stirred until a homogeneous solution was obtained. The catalyst, 4.0 gms. of "Triton B" (trimethylbenzylammonium hydroxide, 40 percent solution in methanol), was added and an immediate color change to a grayish violet was noted. The mixture was heated to reflux temperature (37° C.) for two hours and allowed to cool. A second addition of 3.9 gms. of "Triton B" produced a mild exotherm. The material was stirred overnight at room temperature, about 25° C., and the reaction was completed by heating to reflux for 6 hours. The maximum temperature was 53° C., reached at the end of the six hour period. The product was refined by diluting it with 200 milliliters of 90% isopropyl alcohol and treating with Amberlite IR–120H and Amberlite IRA–68 ion exchange resins. The isopropanol was then distilled by heating to a temperature of 150° C. and a pressure of 1 mm. The residue product weighed 214.9 gms. The product analyzed as follows:

| | |
|---|---|
| Molecular weight | 875 |
| Hydroxyl number | 342.8 |
| Equivalent weight | 163.7 |
| Functionality | 5.3 |

A urethane foam was produced from the above-identified polyol by the one-shot technique. The following was employed:

| Component: | Parts, by weight |
|---|---|
| Polyol, Example 78 | 100 |
| Methylene chloride | 38.5 |
| Stannous octoate | 0.7 |
| N,N,N',N'-tetramethyl-1,3-butanediamine | 0.7 |
| Dimethylsiloxane oil | 1.5 |
| Silicone surfactant[1] | 1.5 |
| Water | 0.25 |
| Organic polyisocyanate[2] | 90.6 |

[1] See footnote in Example 77, above.
[2] A polyisocyanate produced by phosgenation of the condensation product of aniline and formaldehyde. The polyisocyanate had an average molecular weight of about 390 and an average equivalent weight of about 134.

The urethane foam had a cream time of 20 seconds, a rise time of 60 seconds, and a tack-free time of 60 seconds. The density of the foam was 3.9 pounds/ft.$^3$

What is claimed is:

1. Process which comprises reacting:
   (a) a compound selected from the group consisting of cyclopentadiene, 1-(1-cyclopentadienyl)cyclopentadiene, an alkylcyclopentadiene wherein there are up to three alkyl substituents and wherein the alkyl has up to four carbon atoms, phenylcyclopentadiene, cyclohexylcyclopentadiene, benzylcyclopentadiene, tolylcyclopentadiene, indene, fluorene, 2,3-di(1-cyclopentadienyl)butane, and 2,3-dimethyl-2,3-di(1-cyclopentadienyl)butane, with
   (b) a compound selected from the group consisting of ethylene oxide and propylene oxide in the presence of
   (c) a catalyst selected from the group consisting of alkali metal, alkali metal hydroxide, alkali metal alkoxide, alkali metal hydride, cyclopentadienyl sodium, cyclopentadienyl potassium, trimethylamine, triethylamine, 1,4-diazabicyclo[2.2.2]octane, bis[2-(N,N-dimethylaminoethyl)ether, tetramethylguanidine, trimethylbenzylammonium hydroxide, and trimethyl 2-hydroxyethylammonium hydroxide, wherein the molar proportion of reactant (a) to reactant (b) is within the range of from about 10:1 to about 1:25, wherein the catalyst is used in an amount of from about 0.05 to about 5 weight percent, based on weight of reactant (a) plus reactant (b), and wherein the process is carried out at a temperature of from about 15° C. to about 260° C., for a period of time sufficient to produce a hydroxyl-containing, substituted cyclopentadiene.

2. The process of claim 1 wherein reactant (a) is cyclopentadiene.

3. The process of claim 2 wherein the molar ratio of reactant (a) to reactant (b) is within the range of from about 1:1 to about 1:15, wherein the catalyst is used in an amount 0.5 to about 2 weight percent, based on weight of reactant (a) plus reactant (b), and wherein the reaction temperature is within the range of from about 50° C. to about 150° C.

4. The process of claim 2 wherein reactant (b) is 1,2-epoxypropane.

5. The process of claim 2 wherein the catalyst is a member of the group consisting of trimethylbenzylammonium hydroxide, trimethylamine, sodium, sodium methoxide, cyclopentadienylsodium, cyclopentadienylpotassium, and potassium hydroxide.

References Cited

UNITED STATES PATENTS 3,288,761  11/1966  Nikles et al.

OTHER REFERENCES

Soviet Inventions Illustrated, February 1965, Gen. Org., p. 10, No. 164,257.

Boberg et al., Z. Naturforschg. 10b, 721–722 (1955).

BERNARD HELFIN, Primary Examiner

H. T. MARS, Assistant Examiner

U.S. Cl. X.R.

117—161; 260—2.5, 47, 75, 77.5, 468, 485, 613, 617, 618

PO-1050
(5/69)

UNITED STATES PATENT OFFICE
CERTIFICATE OF CORRECTION

Patent No. 3,524,890   Dated August 18, 1970

Inventor(s)   E. F. Cox

It is certified that error appears in the above-identified patent and that said Letters Patent are hereby corrected as shown below:

Column 1, line 47, change "a bis(2-hydroxymethyl)" to --a bis(2-hydroxyethyl)--.

Column 3, line 34, change "$[5.2.0^{2,6}]$" to --$[5.2.1.0^{2,6}]$--.

Column 5, line 50, change "0.05" to --0.5--.

Column 18, TABLE II, under heading "functionality" insert the footnote number, "3".

Column 18, TABLE II, under heading "Cyclopentadiene, g." change "$24_{132}$" to read --$34_{132}$-- (see Example No. 43

Column 18, TABLE II, under heading "Reaction time, hrs." change "$25_5$" to read --$35_5$-- (see Example No. 43).

SIGNED AND
SEALED
NOV 3 1970

(SEAL)
Attest:

Edward M. Fletcher, Jr.
Attesting Officer

WILLIAM E. SCHUYLER, JR.
Commissioner of Patents